UNITED STATES PATENT OFFICE.

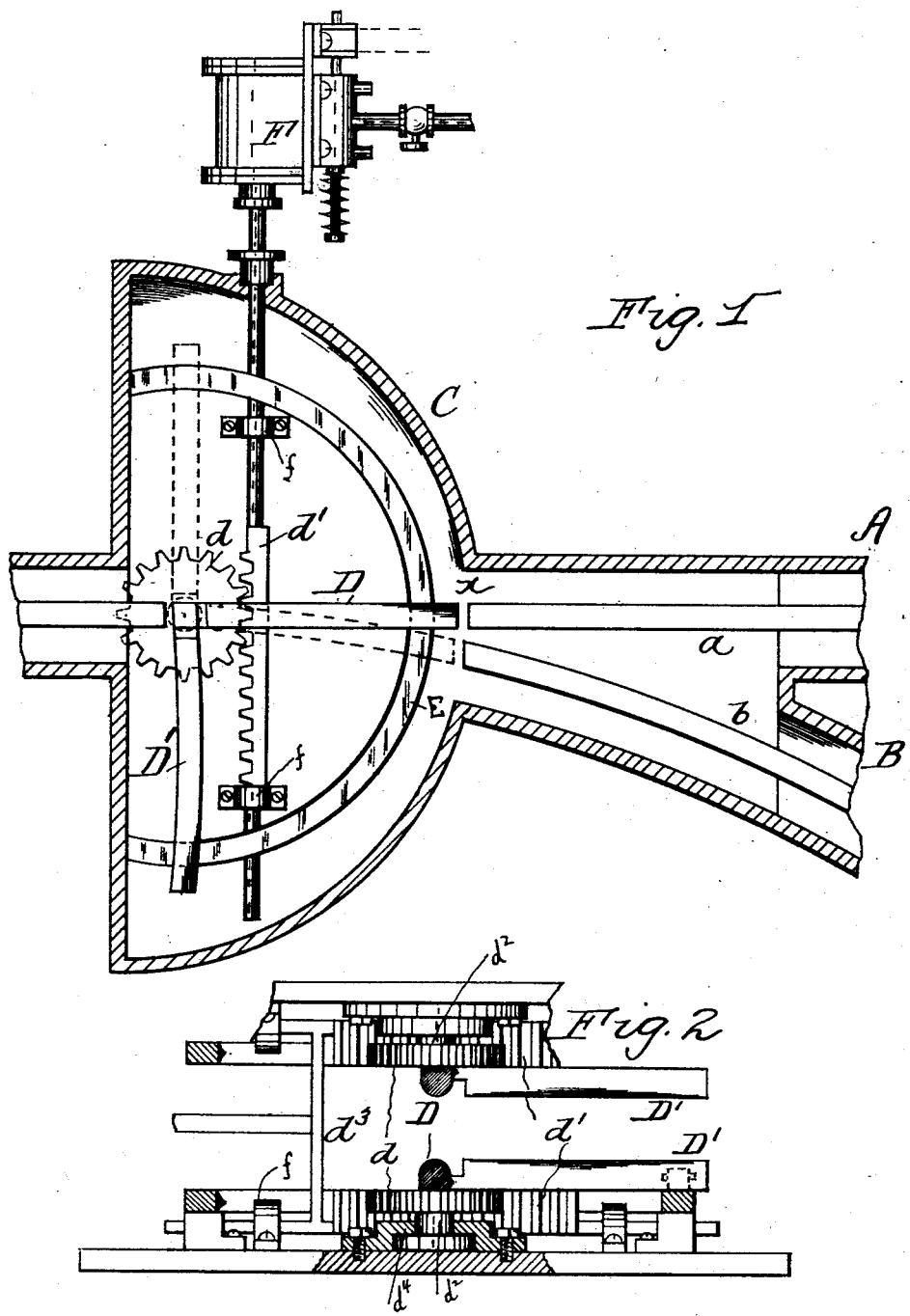

SAMUEL F. LEAKE, OF PHILADELPHIA, PENNSYLVANIA, ASSIGNOR TO THE LEAKE PNEUMATIC TRANSPORTATION COMPANY, OF SAME PLACE.

SWITCH-RAIL FOR PNEUMATIC DISPATCH SYSTEMS.

SPECIFICATION forming part of Letters Patent No. 520,064, dated May 22, 1894.

Application filed January 14, 1892. Serial No. 418,106. (No model.)

*To all whom it may concern:*

Be it known that I, SAMUEL F. LEAKE, a citizen of the United States, residing at Philadelphia, in the county of Philadelphia and State of Pennsylvania, have invented certain new and useful Improvements in Switch-Rails for Pneumatic Dispatch Systems; and I do hereby declare the following to be a full, clear, and exact description of the invention, such as will enable others skilled in the art to which it appertains to make and use the same.

My invention has relation generally to pneumatic dispatch or transit systems of the form in which the tubes are provided with track ways or rails for the wheel-supported carriers to travel upon, and in which the switches employed for diverting the carriers from one part of the system to another through different leading tubes form a part of the rails upon which the carriers travel, and said switches are inclosed in air-tight boxes or casings and preferably operated by power appliances through the instrumentality of suitable appliances located either within the switch-boxes or casings or at a distance from the same.

My invention has for its object to provide a simple, economical and durable form of top and bottom switches for the top and bottom track-ways in the system, which switches each comprise a straight and a curved track-way radially mounted upon a vertically located pintle so that a rotation or oscillation of the latter sets and resets the switches as described.

My invention accordingly consists of the combinations, constructions and arrangements of parts as hereinafter more particularly described in the specification and pointed out in the claims.

Reference is to be had to the accompanying drawings, wherein—

Figure 1 is a sectional plan showing two lines of different leading tubes cut away at their junction, and joined by an air-tight box or casing, cut rails for said tubes, and a rotating switch-rail or rails in the casing with power actuating appliances in accordance with my improvements; and Fig. 2 is a sectional elevation of the switch detached from the casing, showing upper and lower members of the same for top and bottom rails in the tubes.

A and B represent two different leading lines of tubes for the system, having rails $a$ and $b$ respectively, which, as shown, consist of a single rail at the top and bottom of the tubes, but these rails may be differently located with respect to the tubes or to each other as desired, and they may project from or sink below the bore of the tubes as the demands of the system require.

C represents any suitable form of air-tight box or casing joining the cut tubes at their junction, which casing may be provided for as desired, and may be of any suitable construction.

The rails $a$ and $b$ are cut away in the casing C, as indicated at $x$, and interposed between them are two switch-rails D D', one straight and the other curved. These rails D D' are radially secured at one end to a pinion or gear wheel $d$ having a shaft or pintle $d^2$ mounted in suitable bearings $d^4$ in the casing so as to revolve when caused to do so by a rack $d'$ in engagement with the power actuating devices or cylinder F, which rack is suitably mounted in bearings $f$ in the casing. When top and bottom tube rails are used, there are two pinions and racks, one for the lower and one for the upper member of the switch, as more plainly seen in Fig. 2, and the racks are connected together as indicated at $d^3$ in order to move the switch members synchronously. The free ends of the switch-rails are supported and move upon fixed guides E mounted as desired in the casing. By moving the rack $d'$, the switches are set as desired. More than two switches may be used for more than two different lines leading into the casing. This rack and pinion connection for the switches is also available for use in the forms of switches shown and described in concurrent pending applications, Serial Nos. 418,104, 418,105, and 418,107. The cylinder or power appliances F may be operated by compressed air or other motive power, or other actuating devices.

For switches for small tubes, the other devices may be substituted for the power appliances.

What I claim is—

1. In a pneumatic dispatch tube system, the combination of two differently leading lines of top and bottom track-ways in said tube cut away at their junction, top and bottom switches in the cut away parts of said track-ways, each switch composed of a differently directed straight and a curved member radially mounted, and actuating mechanism for said switches, substantially as set forth.

2. In a pneumatic dispatch tube system, the combination of separate upper and lower track-way switches, each composed of two differently directed members radially mounted in said tube, separate actuating mechanism for each said switch in engagement with a single controlling device for setting and unsetting said switches, substantially as set forth.

3. The combination of a shaft or pintle, radially arranged straight and curved switch rails on said shaft or pintle, actuating mechanism for said shaft, and a fixed support for the free ends of the switch rails to ride or move upon, substantially as set forth.

In testimony whereof I affix my signature in presence of two witnesses.

SAMUEL F. LEAKE.

Witnesses:
WM. WARD MOHUN,
CHAS. F. PIKE.